Sept. 24, 1968  P. J. MOORE  3,402,527
MUD DEGASIFIER
Filed May 9, 1967  2 Sheets-Sheet 1
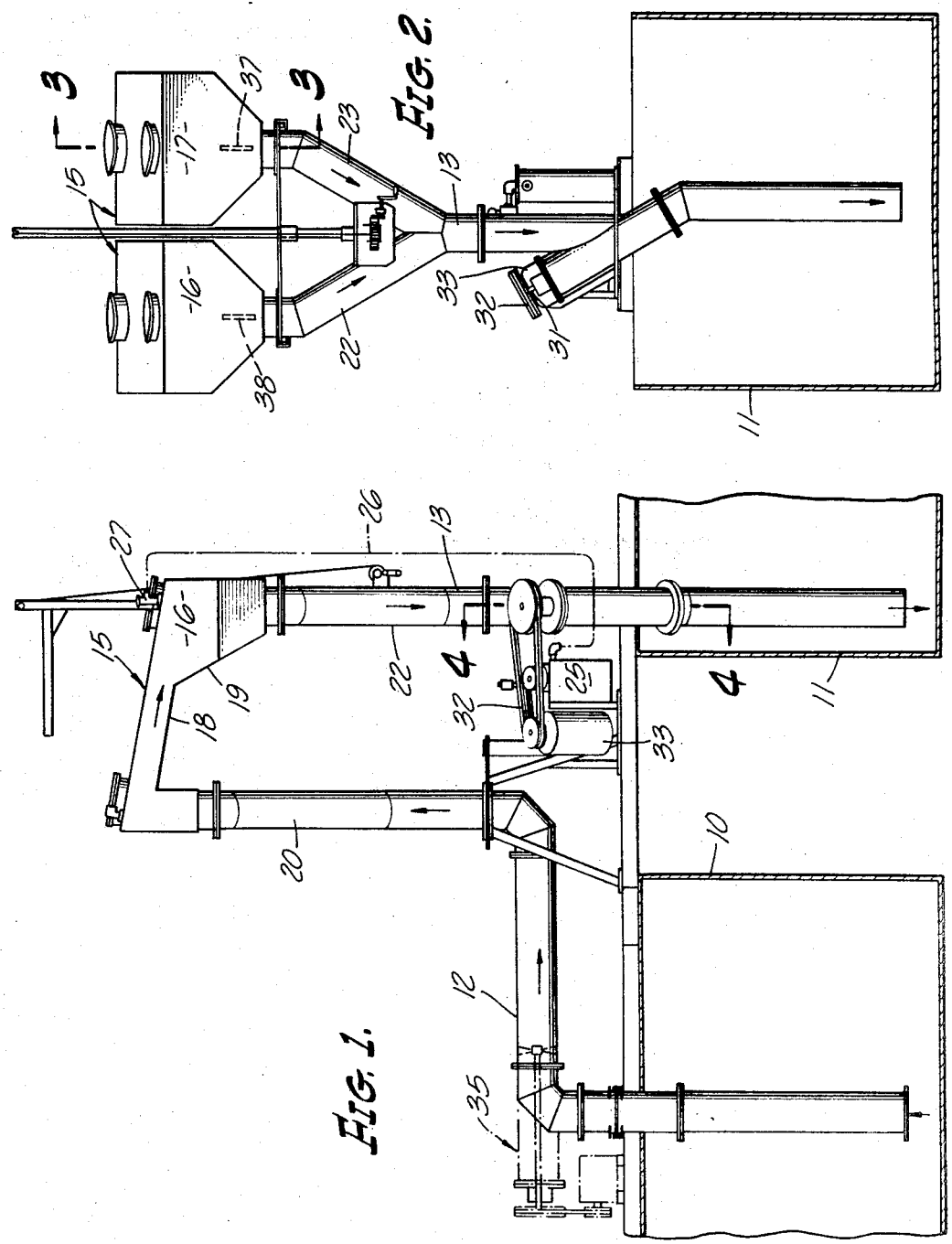
INVENTOR.
PERNELL J. MOORE
BY
AGENT Sept. 24, 1968  P. J. MOORE  3,402,527
MUD DEGASIFIER
Filed May 9, 1967  2 Sheets-Sheet 2
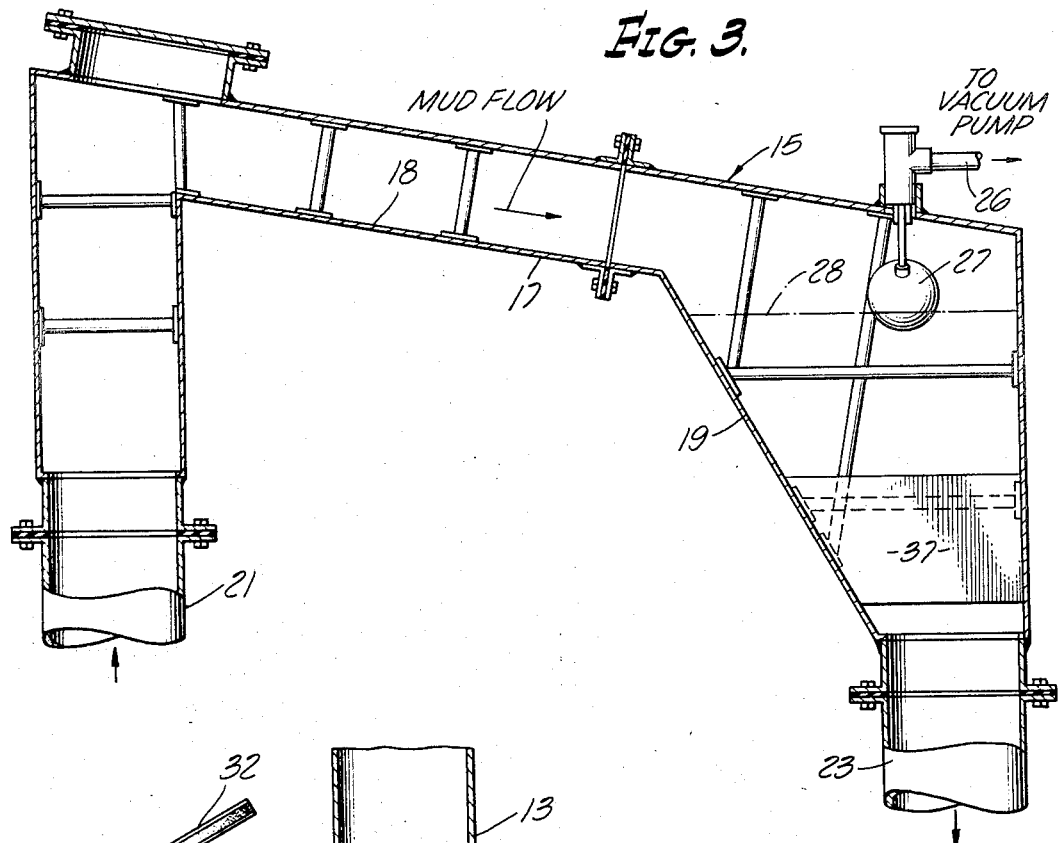
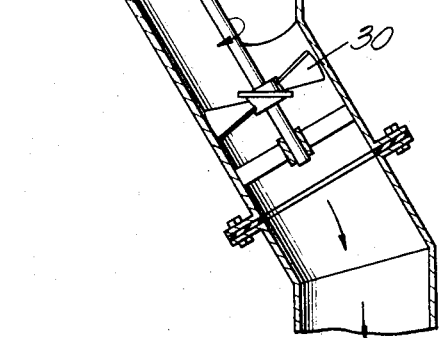
INVENTOR.
PERNELL J. MOORE
BY
AGENT United States Patent Office 3,402,527
Patented Sept. 24, 1968

3,402,527
MUD DEGASIFIER
Pernell J. Moore, Houston, Tex., assignor to National Lead Company, New York, N.Y., a corporation of New Jersey
Filed May 9, 1967, Ser. No. 637,205
3 Claims. (Cl. 55—170)

ABSTRACT OF THE DISCLOSURE

A mud degasser having at least one vacuum chamber containing a downwardly sloping sluice between the tops of a mud riser and a mud downflow pipe. The mud is simultaneously drawn upwardly to the chamber and moved through the downwardly sloping sluice to the downflow pipe under reduced pressure. A vertical septum is positioned within the mud downflow pipe below the liquid level to prevent vortex formation within the mud downflow pipe.

---

This invention relates to mechanical degasifiers for drilling mud, and more particularly, to an improved vacuum apparatus for the purpose.

In a number of environments wherein a mud is circulated, the commonest being the rotary drilling fluids, commonly called "muds," used in drilling wells in search of oil and gas, the circulating mud may take up gas, which generally comes from seepage into the circulating system from gas contained in formations being drilled through. In general, such gas is undesirable since it lowers the effective density of the mud, may lead to blow-outs both by simple density lowering and an aggravated geyser-like form of density lowering, and it may change the rheological characteristics of the mud. Furthermore, it complicates logging methods which depend upon a more or less continuous assay of the mud for gas content.

Many procedures have been suggested and used for freeing mud from such occluded gas. The mud may be treated with degelling chemicals; it may be passed through screens or over riffle boards similar to those used in the mining industry, although when this is carried out at atmospheric pressure, thick muds may not release useful amounts of gas; the mud may be passed through a centrifuge or hydrocyclone; and, finally, the mud may be passed through some kind of a vacuum chamber as taught, for example, in British Patent No. 809,430 and in United States Patent No. 3,255,576.

As a general rule, the methods heretofore available for degasifying mud have some disadvantages. Thus, chemical methods work only in selected instances, and then may not be operable over a long course of drilling. Again, the vacuum methods heretofore proposed are not entirely satisfactory because of cumbersome mechanical arrangements, inefficient stripping of gas, or unduly large power requirements, or a combination of these.

An object of the present invention is to provide a mud degasifier of the vacuum type which is composed of mechanically simple parts, and yet exhibits excellent gas-stripping ability with minimal power requirements.

Other objects of the invention will appear as the description thereof proceeds.

In the drawings, FIGURE 1 is a side view, partly in section, showing the inventive apparatus in place in a mud system.

FIGURE 2 is an end view, partly in section, of the apparatus of FIGURE 1.

FIGURE 3 is an enlarged, detail view, partly in section, taken as shown by the arrows in FIGURE 2.

FIGURE 4 is an enlarged, detail view, partly in section, taken as shown by the arrows in FIGURE 1.

Generally speaking and in accordance with an illustrative embodiment of my invention, I provide a mud degasifier which operates on mud contained in a mud-supply vessel means 10, and which delivers it, subsequent to degasifying treatment, to a mud-receiver means 11. Extending from below the mud level in tank 10, and upwardly to vacuum-chamber means 15, is a mud-uptake-pipe means 12, which may be constructed of sections of pipe siutably coupled together as common in oil field practice and as shown in the drawings. Extending downwardly from the vacuum-chamber means 15 is a mud-downflow-pipe means 13, of the same general nature of the uptake pipe means or assembly, and which extends downwardly to below the mud level in receiving vessel 11.

The vacuum-chamber means 15 is comprised of at least one chamber, and I prefer two chambers 16 and 17, as shown in the drawings. A single chamber 17 is shown in detail in FIGURE 3; it comprises a sluice-way, or sluice means, 18, which provides a downwardly sloping path for the mud from the uptake pipe means 12 to the mud-collector portion 19 of the chamber, from which the mud discharges into the downflow pipe means 13. In the preferred embodiment, which I show in the drawings, the provision of two vacuum chambers 16 and 17 in parallel utilizes a branched mud-supply conduit; uptake means 12 branches into a pair of pipes 20 and 21; and in a similar fashion, the mud leaving the vacuum chambers flows through a bifurcated portion 22 and 23 of mud-downflow-pipe means 13.

Also in the preferred embodiment, I place a vertical septum 37 in the lower end of the mud-collector portion 19 of the chamber, which effectively prevents a vortex from forming in the downflow pipe portion of the apparatus. A simple vertically disposed septum of sheet stainless steel suffices. Its preferred position may be seen from FIGURES 2 and 3, 38 is the corresponding septum in chamber 16.

Vacuum is supplied to the vacuum-chamber means 16 and 17 by any convenient source of vacuum, such as an electrically operated vacuum pump 25 which is connected to the vacuum chambers through a tubing or pipe means 26, entering the upper part of the vacuum chambers. As may be seen in more detail in FIGURE 3, I incorporate a float valve 27, which closes off the supply of vacuum when the mud level reaches a pre-selected height, shown by the dashed level line 28 in FIGURE 3. Of course, the float 27 could with identical effect be used to operate an electrical switch connected to the motor which operates the vacuum pump 25.

Now, if a vacuum is pulled on the vacuum chambers sufficient to cause mud to rise in the uptake pipe means 12 to a sufficient height that mud commences to spill into the sluice-way 18, then it is clear, in view of the downward slope of sluice 18, that the mud would flood the righthand portion of the vacuum chamber, as seen in FIGURE 3. However, during operation of my inventive degasifier, I bring about an imbalance in the hydrostatic equilibrium between the two, by putting either downwardly directed propulsion in the downflow means 13, or upwardly directed propulsion in the uptake pipe means 12. I prefer the first, as a general rule, and that is shown in full lines in FIGURES 1 and 2 and in the sectional detailed view of FIGURE 4. As shown therein, I may provide a simple propeller 30 carried by and rotated by a shaft 31, driven by a belt and pulley means 32 by a motor means 33. It will be clear that the operation of this downwardly directed propulsion in the downflow pipe means will operate to lower the mud level below a flooding height in chamber 19, and with the operation of the float valve 27, my apparatus can run continuously with mud entering through pipe 21 (considering vacuum chamber 17 as shown in FIGURE 3), spilling down the sluice 18, and reaching the mud level 28, whence the mud is eventually discharged having been stripped of its gas into vessel 11.

Under certain circumstances, it may be more convenient to apply upwardly directed propulsion in the uptake means, and I have shown this in phantom in FIGURE 1 at 35. This is often advantageous when the mud is quite thick or quite heavy or both.

It will be appreciated that the distance between the mud level in the tanks and the top of the sluice must be somewhat less than the barometric height of the mud column. Furthermore, since the muds to be treated are in general considerably more dense than water, having a density commonly from about 1.2 to about 2.0, the barometric height for the mud is correspondingly reduced as compared to plain water, for which, as is well known, the barometric height is about 30 feet. Moreover, utilization of the full barometric height will require a complete vacuum, and it is more convenient to use a partial vacuum of the order of 0.4 to 0.5 atmosphere, that is, from about 15 to about 18 inches of mercury. Taking all these factors into consideration, a practical working height for the distance from the top of the sluice-way 18 to the mud level in the tanks is of the order of 10 feet. The drawings are approximately to scale, with the vertical pipes, such as 20 of FIGURE 1, being 8⅝ inches O.D. in a typical, preferred installation.

With the inventive device constructed as shown in FIGURES 1 and 2, and having the dimensions just given, using a vacuum of 17 inches of mercury applied to the vacuum chamber, and operating the propeller 30 at 900 r.p.m., 10 barrels per minute of a 12-pound-per-gallon typical field mud was moved through the apparatus and efficiently freed of gas.

An advantage of the preferred design shown in the drawings having two vacuum chambers in parallel is that the maximum weight of any piece which must be lifted in assembling the device is kept to a reasonably low figure; and that for drilling operations on a reduced scale, such as work-overs, slim-hole exploratory drilling, and the like, only one vacuum chamber need be placed in service.

It goes without saying, of course, that the entire assembly of up and down pipes and vacuum chambers should be hermetically tight so as to avoid leakage. This is especially important in the uppermost portions of the inventive device where the pressure differential between the outside atmosphere and the inner partial vacuum is greatest. A small leak in the upper portion of vacuum chamber 16, for example, would cause the vacuum pump to be operated more than otherwise, and this would lead to undue power consumption.

It will be seen that my inventive device is extremely efficient from the standpoint of power consumption. The power requirements are brought about by the frictional losses in moving the mud though pipe means 12 and 13. This frictional loss can be brought to any figure by simply choosing a large diameter for the pipe involved. A reasonable pipe diameter for an average installation is about eight inches. The other source of power requirements in my inventive apparatus arises from the fact that the mud is lifted to a somewhat higher level than level 28 in order to reach the sluice 18. This power requirement is proportional to the weight of mud moved per unit time and the difference in heights involved, which in a practical apparatus as shown in the drawings, can be as little as about one foot. The overall power requirements are so slight, in fact, that the simple propeller arrangement shown in the drawings suffices for all ordinary requirements.

A great practical advantage of my inventive arrangement resides in the physical separation of the sluice-way and the collector portion of the vacuum chamber. The action of the sluice-way is to provide a sheet of flowing mud which readily releases its gas by reason of the agitation from flow in combination with the vacuum and the relatively thin layer of flowing mud. This gives much better degassing performance than those prior-art devices which use simply a tank or chamber into which the mud is intoduced for the purpose of applying a vacuum thereto. Gas bubbles are not readily removed from a voluminous mass of mud, even though a vacuum may be applied and indeed agitation as well. In my arrangement, by the time the mud reaches the collector portion of the vacuum chamber, it has already given up its burden of gas, as has been described.

It will be apparent that while I have described my invention with the aid of numerous specific examples, and in terms of particular embodiments, and the like, numerous variations in detail, and arrangement, and the like, are possible in both the inventive apparatus and process, so that the invention is to be considered a broad one, defined by the scope of the claims which follow.

What is claimed is:

1. In a mud degasifier, in combination,
   uptake pipe means;
   downflow pipe means;
   mud-supply vessel means;
   mud-receiver vessel means;
   at least one vacuum chamber separating means each including a downwardly sloping sluice means leading to a mud-collector portion, said vacuum chamber means connected between the top of said mud-uptake-pipe means and the top of said mud-downflow-pipe means, said sluice means declining downwardly from said uptake pipe means to said mud-collector portion, the lower end of said mud uptake means communicating with said mud-supply vessel means, and the lower end of said mud downflow means communicating with said mud-receiver vessel means;
   vacuum supply means connected to said vacuum chamber separating means;
   mud-propelling means in at least one of said mud pipe means;
   float operated liquid level control means in said vacuum chamber operated to maintain the level of mud in said mud-collector means at a preselected level;
   and a vertical septum in said mud-collector portion placed below said preselected level to prevent vortex formation in said mud downflow means.

2. The method of operating the mud degasifier of claim 1 in which a vacuum is applied to said chamber means simultaneously with activation of the mud-propelling means, said vacuum being sufficient in cooperation with the said mud-propelling means to cause mud to pass through the degasifier without the interposition of additional propulsive means.

3. The degasifier in accordance with claim 1 wherein said mud-propelling means are in said mud-uptake-pipe means, whereby the requirements of said vacuum-supply means are lessened.

References Cited

UNITED STATES PATENTS

| 2,195,898 | 4/1940 | Newton | 55—90 |
| 3,201,919 | 8/1965 | Long | 55—170 |
| 3,255,576 | 6/1966 | Dawkins | 55—192 |

FOREIGN PATENTS

| 809,430 | 2/1959 | Great Britain. |

REUBEN FRIEDMAN, *Primary Examiner.*

C. N. HART, *Assistant Examiner.*